United States Patent [19]
Milavec et al.

[11] Patent Number: 5,636,116
[45] Date of Patent: Jun. 3, 1997

[54] SYNCHRONOUS RECTIFIER IMPERVIOUS TO REVERSE FEED

[75] Inventors: Johann Milavec, Windisch; Philip Allington, Uster, both of Switzerland

[73] Assignee: Melcher AG, Uster, Switzerland

[21] Appl. No.: 351,288

[22] PCT Filed: Sep. 14, 1993

[86] PCT No.: PCT/CH93/00225

§ 371 Date: Dec. 8, 1994

§ 102(e) Date: Dec. 8, 1994

[87] PCT Pub. No.: WO95/02918

PCT Pub. Date: Jan. 26, 1995

[51] Int. Cl.$^6$ ..................................................... H02M 7/217
[52] U.S. Cl. ............................................. 363/89; 363/127
[58] Field of Search ................................. 363/20, 21, 53, 363/89, 127

[56] References Cited

U.S. PATENT DOCUMENTS

| | | | |
|---|---|---|---|
| 4,716,514 | 12/1987 | Patel | 363/89 |
| 4,870,555 | 9/1989 | White | 363/21 |
| 5,128,603 | 7/1992 | Wolfel | 363/21 |
| 5,144,547 | 9/1992 | Masamoto | 363/127 |
| 5,343,383 | 8/1994 | Shinada et al. | 363/127 |
| 5,430,640 | 7/1995 | Lee | 363/20 |

FOREIGN PATENT DOCUMENTS 0396125  3/1990  European Pat. Off. ........ H02M 3/335

OTHER PUBLICATIONS

Blanc; "Practical Application of MOSFET Synchronous Rectifiers"; Nov. 1991; IEEE Intelec 91, pp. 495–501.

*Primary Examiner*—Jeffrey L. Sterrett
*Attorney, Agent, or Firm*—Jenkens & Gilchrist, P.C.

[57] ABSTRACT

In a synchronous rectifier having at least a transformer whose flow of current through the primary winding is periodically switched on and off and includes, as a controlled rectifier, a first and second MOSFET. A third and fourth MOSFET are provided whose source terminals are connected to the gate terminals of the first and second MOSFETs and to a second of two output terminals of the rectifier through a resistor. A Schottky diode is connected in parallel with the drain and source terminals of the first MOSFET with the cathode of the Schottky diode and the drain terminal of the first MOSFET being connected to a first of the two output terminals. A switching block circuit is connected between the parallel connection of the Schottky diode and the first MOSFET and the second output terminal of the rectifier. A capacitor is connected between the gate terminals of the third and fourth MOSFETs and the second output terminal of the rectifier. The output of a logic unit is connected in parallel with the capacitor. The logic unit receives an output from a switching block which output provides an indication of the current through the parallel connection of the Schottky diode and the first MOSFET. In the event of failure of current through the switching block, the logic unit provides a short across the capacitor resulting in a change from normal synchronous rectifier operation to a diode rectifier operation through the substrate diodes of the first and second MOSFETs.

18 Claims, 3 Drawing Sheets

SYNCHRONOUS RECTIFIER IMPERVIOUS TO REVERSE FEED

BACKGROUND OF THE INVENTION

1. Field of the Invention

The present invention relates to rectifier circuits and, more particularly, to a synchronous rectifier circuit that is impervious to reverse feed.

2. History of the Related Art

Feeder devices with synchronous rectifiers are known per se, and are in use as electric power supplies. In the same way, such devices are known from publications, for example, from O. Kilgenstein, Schaltnetzteile in der Praxis, Wuerzburg, 1992. Each of the known devices has a range of operation that is limited at the top by the maximum output current at which the output voltage is still regulated to the desired value.

If, either temporarily or for long periods, the current requirement is greater than the capacity of a single device and the selection of a similar device of greater capacity is not indicated for certain reasons, then these devices are connected in parallel.

If in one of the devices that is connected together in parallel in this manner, an operating state arises in which either the output voltage drops or the oscillator no longer triggers or interrupts the primary transformer, then the devices that are connected in parallel with the device under consideration feed power back into the device that is either temporarily or permanently out of service, which as a rule leads to the destruction of the controlled rectifier or to a collapse of the output voltage.

The present invention provides an improvement over the prior art by providing a synchronous rectifier circuit that is impervious to reverse feed, and that is fully capable of operation in all operating states.

SUMMARY OF THE INVENTION

The present invention relates to a synchronous rectifier circuit which includes a direct-current source whose flow of current through the primary winding of a transformer is periodically switched on and off by means of an electronic switch. The circuit contains, as a controlled rectifier, a first and second MOSFET. If two or more such synchronous rectifiers are connected together in parallel, in the event of the failure of a synchronous rectifier, the first and second MOSFETS are protected from destruction resulting from reverse feed from the failed rectifier or the remaining rectifier by the present invention.

More particularly, one aspect of the present invention includes the insertion of a third and a fourth MOSFET into the circuit which includes a first capacitor connected across the output thereof. The source terminal of the third MOSFET is connected to the gate terminal of the first MOSFET and the source terminal of the fourth MOSFET is connected to the gate terminal of the second MOSFET. Each source terminal of the third and fourth MOSFETS is connected to one output of the circuit through a separate resistor. Each gate terminal of the third and fourth MOSFETS is connected to one end of the secondary winding through a resistor and to the one output through a second capacitor. The other output of the circuit is connected to one end of the secondary winding of the transformer through a choke. The other end of the secondary winding is connected to the drain terminal of the second MOSFET. A Schottky diode is connected across the drain and source terminals of the first MOSFET.

A switching block is connected between the one output and the source terminal of the first MOSFET to measure the current flowing through the first MOSFET and the Schottky diode. The output of the switching block is input to a logic unit whose output is connected across the second capacitor. If the induction voltage through the secondary winding of the transformer is too small, then the first and second MOSFETS block and the logic unit short circuits the second capacitor and ensures a clean change from the type of operation with connected rectifiers to non-sensitive diode operation.

In another aspect, the present invention relates to the circuit described above wherein the switching block includes a transformer whose primary winding is connected in series with the parallel connection of the first MOSFET and the Schottky diode and whose secondary winding is connected in series with a diode and resistor. The output from the switching block is taken at the connection between the diode and resistor.

In another aspect, the present invention relates to the circuit described above wherein a first embodiment of the logic unit includes a re-triggerable monostable multivibrator which receives an input signal from the switching block. The output of the re-triggerable monostable multivibrator is connected to a transistor whose emitter-collector terminals are wired in parallel with the second capacitor. The re-triggerable monostable multivibrator provides an output signal to the base of the transistor in the event of a failure of the input signal from the switching block.

In another aspect, the present invention relates to the circuit described above wherein a second embodiment of the logic unit includes a diode which receives an input from the switching block and charges a parallel circuit formed by a third capacitor connected in parallel with a resistor. An amplifier receives one input from the parallel circuit and a second input from a reference signal. A transistor receives the output from the amplifier on its base terminal. The emitter-collector terminals of the transistor are connected in parallel with the second capacitor.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1A:
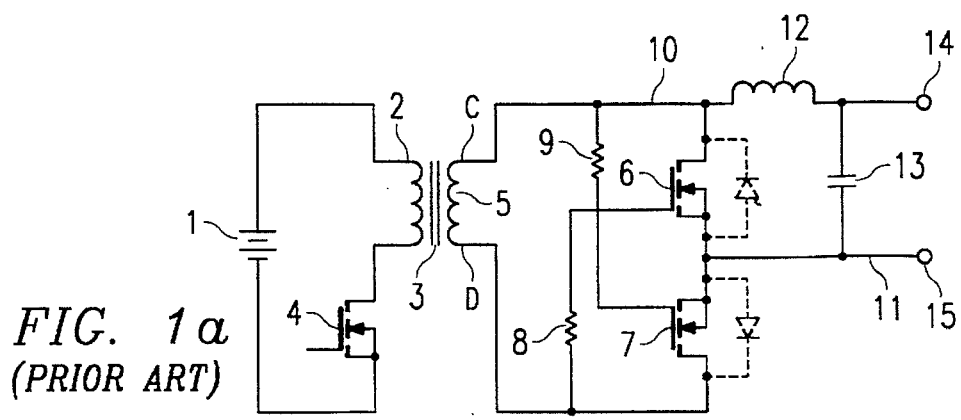
FIG. 1a is a schematic diagram showing a conventional synchronous rectifier.

In FIG. 1a, a circuit in accordance with the state of the art is shown. A direct current source 1 feeds the primary winding 2 of a transformer 3. The current that supplies the primary winding 2 is periodically interrupted by an electronic switch 4, as a result of which an approximately rectangular current and voltage pulse arises in the secondary winding 5 of the transformer 3. A first MOSFET 6 and a second MOSFET 7, the gates of which are triggered by two resistors 8 and 9, are used as controlled rectifiers, and supply two lines 10 and 11 with current in phase with the switch 4. The line 11 is connected directly to a negative output 15, while a storage choke 12 is connected between a positive output 14 and the drain electrode of first MOSFET 6. The resistor 9 is connected to the secondary winding 5 at end C, the resistor 8 is connected to the secondary winding 5 at end D. The end C of the secondary winding 5, the connection of the resistor 9, the drain electrode of first MOSFET 6, and one of the connections of the storage choke 12 form one node, while the end D of the secondary winding 5, the connection of the resistor 8, and the drain electrode of second MOSFET 7 form an additional node. The source electrodes of the first and second MOSFETs 6 and 7 are connected to the line 11. Between the outputs 14 and 15 there is a capacitor 13 that has a smoothing and storage function.

This circuit requires that a passive load be applied between the outputs 14 and 15. If, however, two or more rectifiers of the type that has just been described are connected together in parallel, it is then possible—for example, if the switching function of switch 4 were to fail briefly—for current to flow back into the circuit, which would lead to a short circuit through the first and second MOSFETS 6 and 7, which are now conductive, and possibly to their destruction. The two so-called substrate diodes of the first and second MOSFETs 6 and 7 are shown as well by means of dashed lines.

Figure 1B:
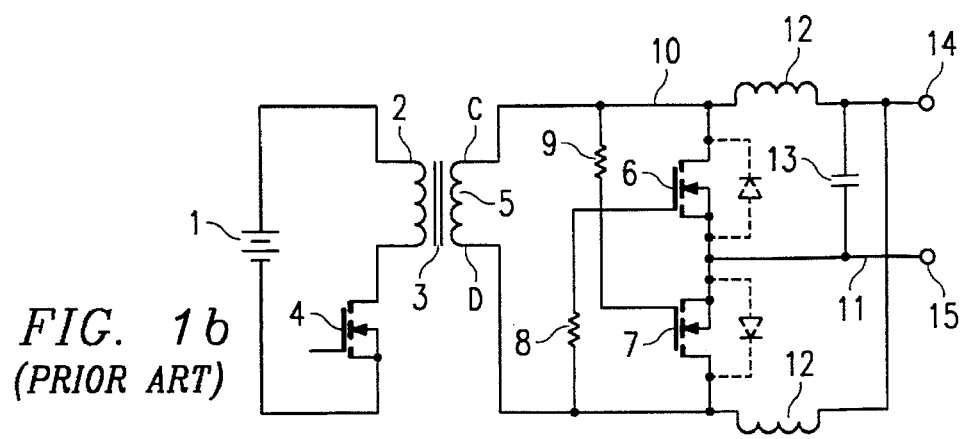
FIG. 1b is a schematic diagram showing another conventional synchronous rectifier.
Figure 2:
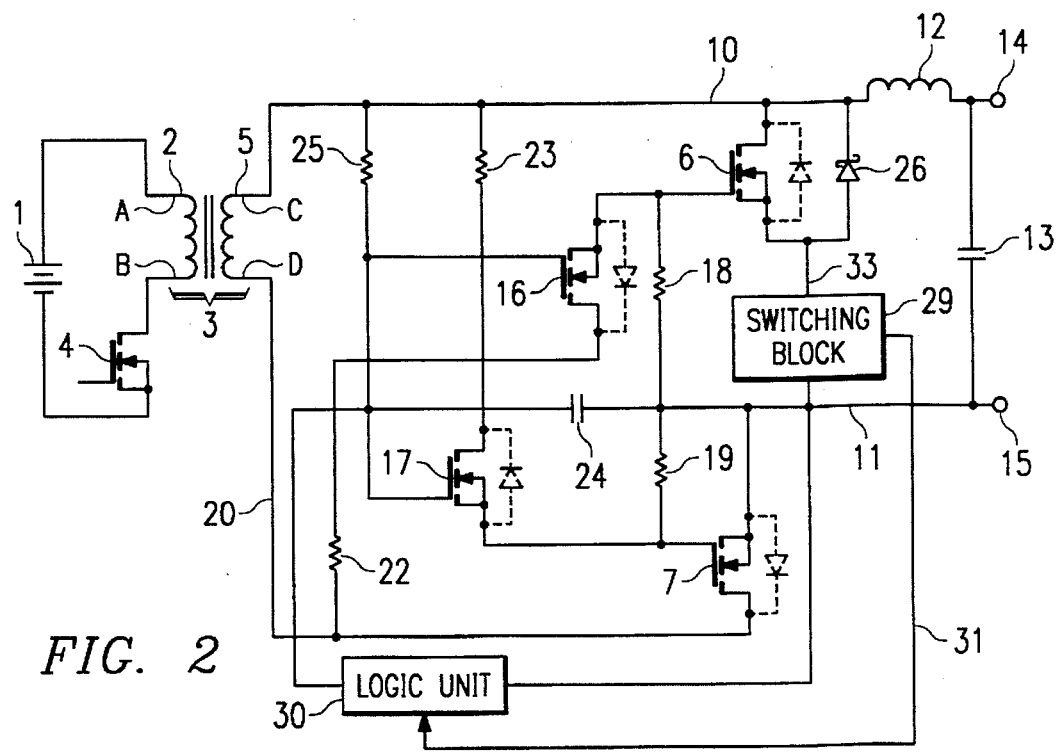
FIG. 2 is a schematic diagram showing a synchronous rectifier constructed in accordance with the principles of the present invention.

FIG. 1b shows a variation of the state of the art in accordance with the U.S. Patent Application of I. D. Jitaru. For the transformer 3, both forward current as well as fly-back operation of the power supply are possible. In addition, in FIG. 1b there is with reference to FIG. 1a a second storage choke 12 present, which improves the quality of the output voltage through the outputs 14 and 15. FIG. 2 shows the basic circuit diagram of the solution in accordance with the present invention. What is essential is, first of all, the fact that the triggering of the gate electrodes of the first and second MOSFETs 6 and 7 is no longer carried out directly through resistors, but instead, the charging state of each gate electrode is created and maintained by means of the source-drain current of one MOSFET that is flowing out through one resistor: To the first MOSFET 6 there is allocated a third MOSFET 16 and a resistor 18 and to the second MOSFET 7 there is allocated a fourth MOSFET 17 and a resistor 19. If the induction voltage $U_{CD}$ through the secondary winding 5 is positive, then a capacitor 24 is charged positively with respect to the potential in line 11, to which the capacitor 24 is connected on the other side, through a resistor 25 that is connected to the end C of the secondary winding 5. The capacitor 24 is connected with the gate electrodes of the third and fourth MOSFETs 16 and 17, and makes them conductive in the event of corresponding polarity of $U_{CD}$. As a result, the gate electrodes of the first and second MOSFETs 6 and 7 are charged and they—in the same way as in the event of corresponding polarity of $U_{CD}$—work conductive and either as a rectifier (MOSFET 7) or as a free-running diode (MOSFET 6).

Figure 3:
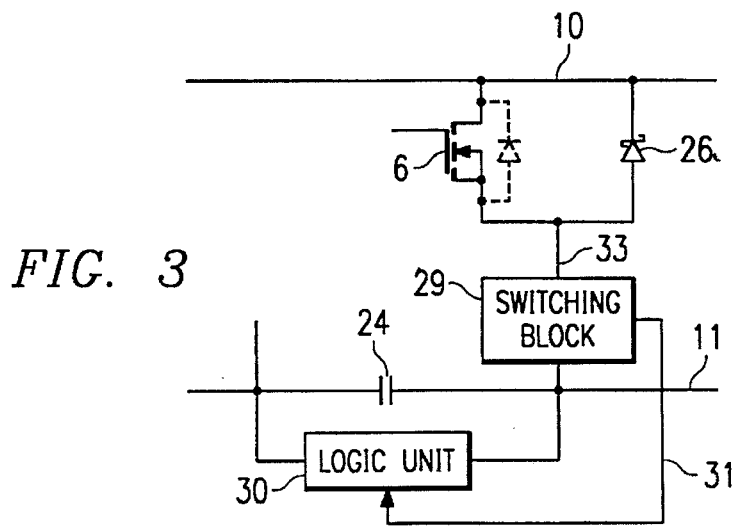
FIG. 3 is a schematic diagram of a portion of FIG. 2 showing the switching block and logic unit.

If the voltage through the capacitor 24 is not sufficiently positive or if the voltage $U_{CD}$ through the secondary winding 5 is too small, then the first and second MOSFETs 6 and 7 block. In that case, only the substrate diodes of the first and second MOSFETs 6 and 7 are conductive and the arrangement works like a normal diode rectifier. The efficiency level does indeed worsen when this occurs, but reverse feed or a short circuit through the first and second MOSFETs 6 and 7 is prevented. By way of a variation, a Schottky diode 26 is wired in parallel to the first MOSFET 6. This Schottky diode 26 is distinguished by lower forward voltage and better switching behavior in comparison to the substrate diode of the first MOSFET 6. In the type of operation as a synchronous rectifier, use can be made of the fact that the first MOSFET 6 is blocked pre-shifted; the current then changes to the Schottky diode 26. The first MOSFET 6 and the Schottky diode 26 are connected with the line 11 by means of the switching block designated with the number 29. The switching block 29 is of no significance for the functioning of the connected rectifier, and it can be considered to be a very low-resistance resistor. The switching block 29 is used for the measurement of current. In order to convert into the diode rectifier operating state, a logic unit 30—which has remained unmentioned up until now, and is drawn in as a block—comes into operation: It short circuits the voltage that has built up through the resistor 25 at the capacitor 24, and ensures a clean change from the type of operation with connected rectifiers to non-sensitive diode operation. The logic unit 30 draws the information for the decision process through a line 31. Embodiments for the logic unit 30 are shown in the following figures. The same circuit—with respect to the switching block 29 and the logic unit 30—is shown in FIG. 3 in more detail. Less essential parts of the circuit have been left out. The switching block 29 measures the current through the first MOSFET 6 and the Schottky diode 26 that is wired in parallel with it, and passes along a value that is analogous to the current, by means of the line 31, to the logic unit 30, which, if a specific threshold is gone under, discharges the capacitor 24 and thus blocks the first and second MOSFETS 6 and 7 through the third and fourth MOSFETs 16 and 17.

Figure 4:
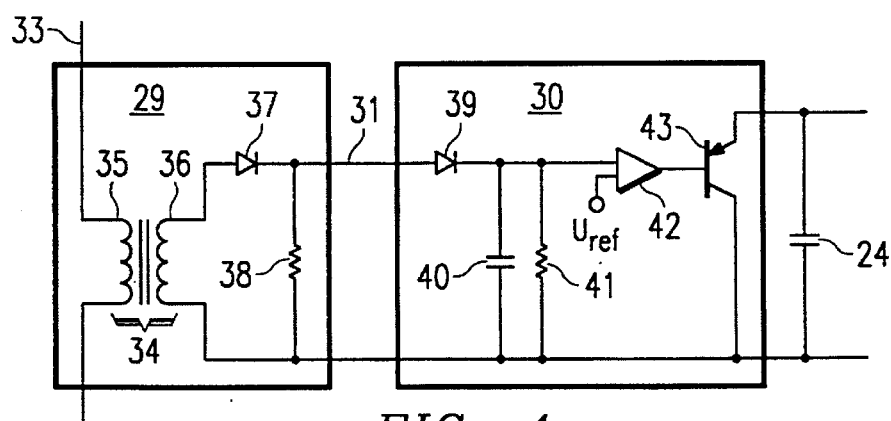
FIG. 4 is a schematic diagram of the details of the switching block and logic unit.

FIG. 4 shows an embodiment for the switching block 29 and the logic unit 30 and their linking together. The current $I_L$ that is to be measured flows through a line that is designated by 33 to first MOSFET 6 and to Schottky diode 26. Wired into the line 33 is a measuring transformer 34 with a primary winding 35, which exhibits only a single winding or a few windings, while a secondary winding 36 exhibits many windings, the voltage of which decreases through a diode 37 at a low-resistance burden resistor 38. This drop in voltage is proportional to the pulsing current $I_L$. The diode 37 blocks in the event of a reversal of the polarity of the current $I_L$, and the voltage induced through the secondary winding 36, and in this way makes possible the reverse magnetizing of the transformer 34. The voltage through the resistor 38 is passed along by means of the previously mentioned line 31 to the logic unit 30; it charges a capacitor 40 to its peak value by means of an additional diode 39. The capacitor 40 is slowly discharged by means of a high-resistance resistor 41. An amplifier 42 that is connected behind this resistor 41 compares the voltage at the capacitor 40 with a fixed reference voltage $U_{ref}$. If the peak value of the current $I_L$ falls below a preset threshold, then a transistor 43 that is wired behind the amplifier 42 becomes conductive, and short circuits the capacitor 24.

The current measuring circuit in the logic unit 30 is known per se, and represents a known current measuring process.

Figure 5:
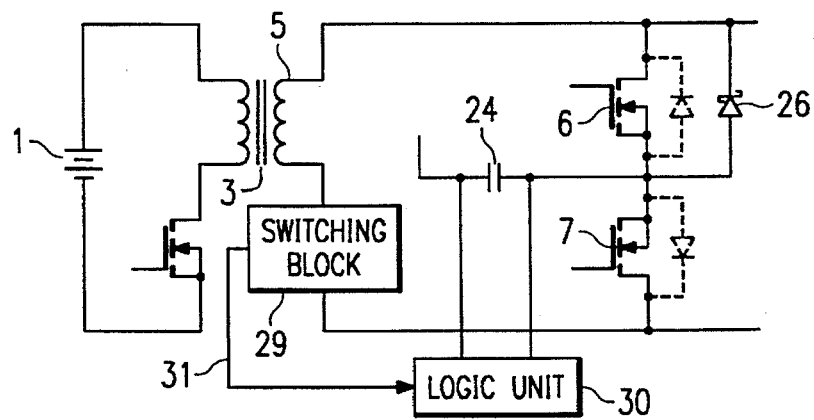
FIG. 5 is a schematic diagram of a first variation of a portion of the embodiment of FIG. 2.
Figure 6:
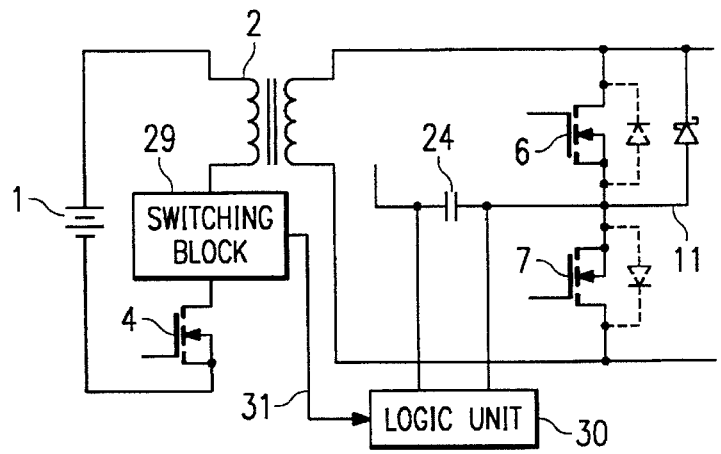
FIG. 6 is a schematic diagram of a second variation of a portion of the embodiment of FIG. 2.

The FIGS. 5 and 6 show variations of FIG. 3 with respect to the location at which the current that is used for the evaluation by the logic unit 30 is measured. Once again, only parts of FIG. 2 are reproduced: In FIG. 5, the current is measured in series with the secondary winding 5 of the transformer 3 and with the source-drain segment of the second MOSFET 7. This is by way of an example only, since the measurement of the current can in principle take place at any location in the current circuit of the secondary winding 5, that is, in a way that is analogous to FIGS. 3 and 4. In FIG. 6, the measurement of the current with the switching block 29 is shown in the primary circuit of the transformer 3. The circuit that is shown in FIG. 4 for the measurement of the current is to be understood as an example only. Of course, other measurement methods, such as the direct voltage drop across a—low-resistance—resistor or the use of a Hall transformer for example, are equally within the sense of the invention.

Figure 7:
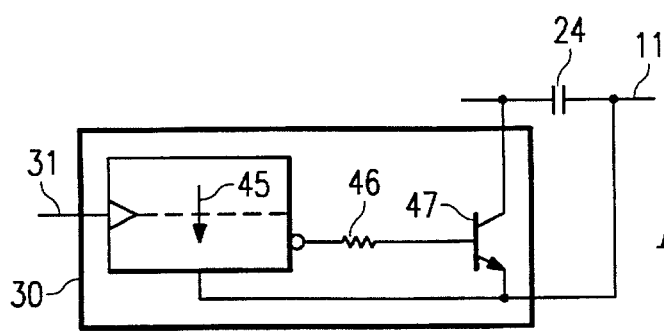
FIG. 7 is a schematic diagram of an additional embodiment of the logic unit.

An additional circuit in accordance with the invention for the logic unit 30 is shown in FIG. 7. The line 31 is here fed from the pulse current that also opens and closes the switch 4 (see FIG. 2). This pulse signal is used as a control signal for a re-triggerable monostable multivibrator 45, the duty cycle of which corresponds approximately to the period of the switching frequency. As long as the control pulses take place at the preset frequency, the multivibrator 45 remains switched on, and a transistor 47 that is wired behind by means of a resistor 46 remains blocked. If the control pulses do not take place, either because the control oscillator is no longer working or because the working frequency at the load drops as a result of a short circuit, then the multivibrator 45 falls back into its resting state, and the transistor 47 becomes conductive and short circuits the capacitor 24, at which time the connected rectifier makes a transition into pure diode operation, and as a result, and in accordance with the invention, thereby becomes impervious to reverse feed.

Figure 8:
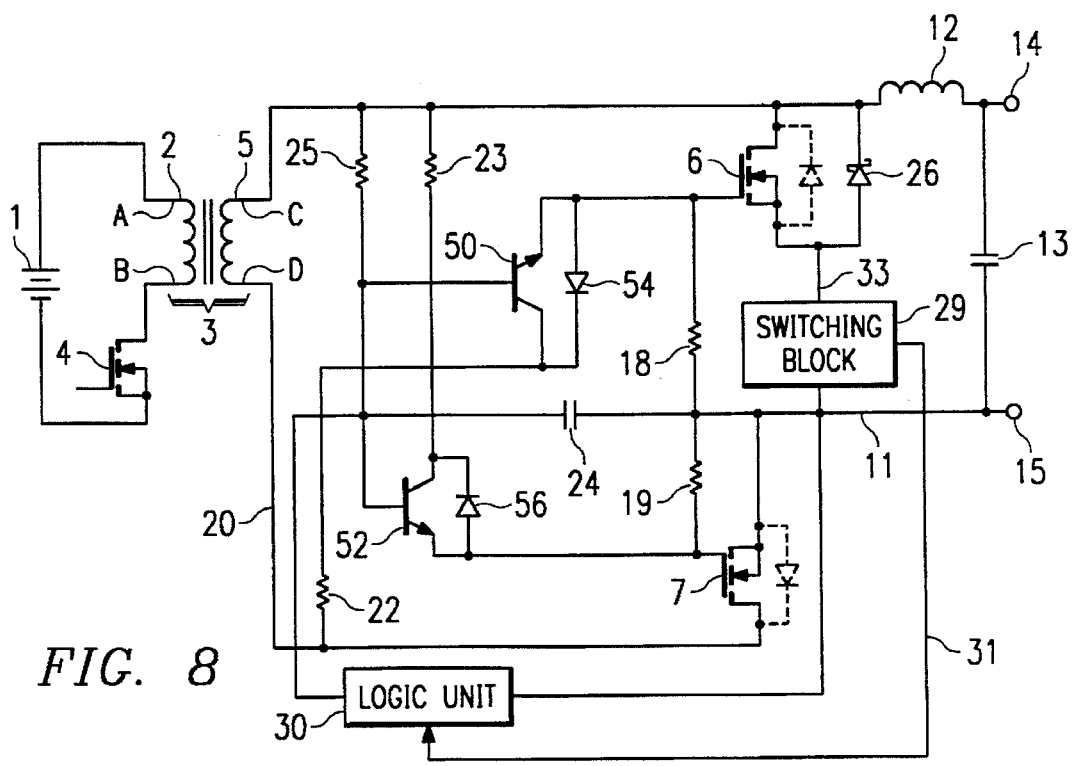
FIG. 8 is a schematic diagram showing another embodiment of a synchronous rectifier constructed in accordance with the principles of the present invention.

As shown in FIG. 8, in place of the third and fourth MOSFETs 16 and 17, a first bipolar transistor 50 and a second bipolar transistor 52 with a first diode 54 and a second diode 56 connected antiparallel to the first and second bipolar transistors 50 and 52, respectively, can, in principle, also be used in the described embodiments. The emitter-collector terminals of first transistor 50 are connected in parallel with the first diode 54 with the emitter terminal connected to the anode of the first diode 54 and the collector terminal connected to the cathode of the first diode 54. The connection of the emitter terminal and the anode of the first diode 54 is connected to the gate electrode of the first MOSFET 6 and to the second output 15 through a first resistor 18. The connection of the collector terminal and the cathode of the first diode 54 is connected to the second end of the secondary winding 5 of the first transformer 3 and the drain electrode of the second MOSFET 7 through a third resistor 22.

The emitter-collector terminals of second transistor 52 are connected in parallel with the second diode 56 with the emitter terminal connected to the anode of the second diode 56 and the collector terminal connected to the cathode of the second diode 56. The connection of the emitter terminal and anode of the second diode 56 is connected to the gate electrode of the second MOSFET 7 and to the second output 15 through a second resistor 19. The connection of the collector terminal and the cathode of the second diode 56 is connected to the first end of the secondary winding of the first transformer 3 and the drain electrode of the first MOSFET 6 through a fourth resistor 23. The remainder of the circuit is the same as that of FIG. 2.

What is claimed is:

1. In a synchronous rectifier circuit including a first transformer having a primary winding and a secondary winding, said secondary winding of the first transformer having a first end and a second end, said primary winding of the first transformer is supplied on an alternating basis with current from a series circuit of a direct-current source and a switch connected across the primary winding of the first transformer, said switch is controlled by a signal received from an oscillator, a first MOSFET and a second MOSFET are connected into said synchronous rectifier circuit on an alternating basis in time with said oscillator whereby the first MOSFET fulfills the function of a recovery diode and the second MOSFET fulfills the function of a rectifier diode, the drain electrode of the first MOSFET is connected to the first end of the secondary winding of the first transformer and to a first output of the circuit through a storage choke, the drain electrode of the second MOSFET is connected to the second end of the secondary winding of the first transformer, the source electrodes of both the first and second MOSFETS are connected to a second output of the circuit, a first capacitor is connected between the first and second outputs, the improvement comprising;

a Schottky diode connected in parallel with the first MOSFET to provide the same direction of conduction as the substrate diodes of the first MOSFET;

a third MOSFET connected into said synchronous rectifier circuit with the source electrode thereof connected to the gate electrode of the first MOSFET and to the second output through a first resistor;

a fourth MOSFET connected into said synchronous rectifier circuit with the source electrode thereof connected to the gate electrode of the second MOSFET and to the second output through a second resistor;

the drain electrode of the third MOSFET is connected to the second end of the secondary winding of the first transformer and the drain electrode of the second MOSFET through a third resistor;

the drain electrode of the fourth MOSFET is connected to the first end of the secondary winding of the first transformer through a fourth resistor;

a second capacitor connected between the gate electrodes of the third and fourth MOSFETs and the second output;

a fifth resistor connected between the first end of the secondary winding of the first transformer and the gate electrodes of the third and fourth MOSFETs; and a logic unit, having two output terminals and one input terminal, is connected into said synchronous rectifier circuit with the output terminals thereof connected across the second capacitor, the logic unit providing a short across the two output terminals discharging the second capacitor when the input terminal receives a signal indicating that the induction voltage $U_{CD}$ through the secondary winding of the first transformer fails for more than one pulse period of the switch.

2. The synchronous rectifier circuit as set forth in claim 1 wherein the signal received at the input terminal of the logic unit is the same signal that controls the switch.

3. The synchronous rectifier circuit as set forth in claim 2 wherein the logic unit comprises:

a re-triggerable monostable multivibrator which receives an input signal at the input terminal and whose dwell period is longer than one pulse period of the switch, the output of the re-triggerable monostable multivibrator is connected by means of a sixth resistor to the base of a first transistor, the emitter-collector terminals thereof are wired in parallel with the second capacitor, the re-triggerable monostable multivibrator provides an output signal to the base of the transistor in the event of a failure of the input signal to the re-triggerable monostable multivibrator.

4. The synchronous rectifier circuit as set forth in claim 2 wherein the logic unit comprises:

a diode which receives an input signal at the input terminal and charges a parallel circuit formed by a third capacitor connected in parallel with a high-resistance resistor;

an amplifier having a first input terminal, a second input terminal and an output terminal is operatively connected to receive the signal from said parallel circuit on the first input terminal and a reference signal on the second input terminal; and a transistor whose base terminal is connected to the output terminal of the amplifier and whose emitter-collector terminals are connected in parallel with the second capacitor.

5. The synchronous rectifier circuit as set forth in claim 4 further including a switching block operatively connected into said synchronous rectifier circuit, said switching block includes a means for measuring the current generated by the secondary winding of the first transformer.

6. The synchronous rectifier circuit as set forth in claim 5 wherein said means for measuring the current generated by the secondary winding of the first transformer comprises:

a second transformer having a primary winding which has a few windings and a secondary winding which has many windings, said primary winding of said second transformer is connected in the current circuit of the secondary winding of the first transformer;

a diode and a low-resistance resistor which are connected in series with each other and in series with the secondary winding of said second transformer; and an output terminal connected to the connection between the diode and the low-resistance resistor.

7. The synchronous rectifier circuit as set forth in claim 5 wherein the switching block is connected between the second output of the synchronous rectifier circuit and the parallel circuit of the first MOSFET and the Schottky diode.

8. The synchronous rectifier circuit as set forth in claim 5 wherein the switching block is connected in series with the second end of the secondary winding of the first transformer.

9. The synchronous rectifier circuit as set forth in claim 5 wherein the switching block is connected in series with the primary winding of the first transformer.

10. A synchronous rectifier circuit including a first transformer having a primary winding and a secondary winding, said secondary winding of the first transformer having a first end and a second end, said primary winding of the first transformer is supplied on an alternating basis with current from a series circuit of a direct-current source and a switch connected across the primary winding of the first transformer, said switch is controlled by a signal received from an oscillator, a first MOSFET and a second MOSFET are connected into said synchronous rectifier circuit on an alternating basis in time with said oscillator whereby the first MOSFET fulfills the function of a recovery diode and the second MOSFET fulfills the function of a rectifier diode, the drain electrode of the first MOSFET is connected to the first end of the secondary winding of the first transformer and to a first output of the circuit through a storage choke, the drain electrode of the second MOSFET is connected to the second end of the secondary winding of the first transformer, the source electrodes of both the first and second MOSFETS are connected to a second output of the circuit, a first capacitor is connected between the first and second outputs, the improvement comprising;

a Schottky diode connected in parallel with the first MOSFET to provide the same direction of conduction as the substrate diodes of the first MOSFET;

a first transistor whose emitter-collector terminals are connected in parallel with a first diode with the emitter terminal connected to the anode of the first diode and the collector terminal connected to the cathode of the first diode, the connection of the emitter terminal and the anode of the first diode is connected to the gate electrode of the first MOSFET and to the second output through a first resistor, the connection of the collector terminal and the cathode of the first diode is connected to the second end of the secondary winding of the first transformer and the drain electrode of the second MOSFET through a third resistor;

a second transistor whose emitter-collector terminals are connected in parallel with a second diode with the emitter terminal connected to the anode of the second diode and the collector terminal connected to the cathode of the second diode, the connection of the emitter terminal and anode of the second diode is connected to the gate electrode of the second MOSFET and to the second output through a second resistor, the connection of the collector terminal and the cathode of the second diode is connected to the first end of the secondary winding of the first transformer and the drain electrode of the first MOSFET through a fourth resistor;

a second capacitor is connected between the base terminals of the first and second transistors and the second output;

a fifth resistor is connected between the first end of the secondary winding of the first transformer and the base terminals of the first and second transistors;

a logic unit, having two output terminals and one input terminal, is connected into said synchronous rectifier circuit with the output terminals thereof connected across the second capacitor, the logic unit providing a short across the two output terminals discharging the second capacitor when the input terminal receives a signal indicating that the induction voltage $U_{CD}$ through the secondary winding of the first transformer fails for more than one pulse period of the switch.

11. The synchronous rectifier circuit as set forth in claim 10 wherein the signal received at the input terminal of the logic unit is the same signal that controls the switch.

12. The synchronous rectifier circuit as set forth in claim 11 wherein the logic unit comprises:

a re-triggerable monostable multivibrator which receives an input signal at the input terminal and whose dwell period is longer than one pulse period of the switch, the output of the re-triggerable monostable multivibrator is connected by means of a sixth resistor to the base of a first transistor, the emitter-collector terminals thereof are wired in parallel with the second capacitor, the re-triggerable monostable multivibrator provides an output signal to the base of the transistor in the event of a failure of the input signal to the re-triggerable monostable multivibrator.

13. The synchronous rectifier circuit as set forth in claim 11 wherein the logic unit comprises:

a diode which receives an input signal at the input terminal and charges a parallel circuit formed by a third capacitor connected in parallel with a high-resistance resistor;

an amplifier having a first input terminal, a second input terminal and an output terminal is operatively connected to receive the signal from said parallel circuit on the first input terminal and a reference signal on the second input terminal; and a transistor whose base terminal is connected to the output terminal of the amplifier and whose emitter-collector terminals are connected in parallel with the second capacitor.

14. The synchronous rectifier circuit as set forth in claim 13 further including a switching block operatively connected into said synchronous rectifier circuit, said switching block includes a means for measuring the current generated by the secondary winding of the first transformer.

15. The synchronous rectifier circuit as set forth in claim 14 wherein said means for measuring the current generated by the secondary winding of the first transformer comprises:

a second transformer having a primary winding which has a few windings and a secondary winding which has many windings, said primary winding of said second transformer is connected in the current circuit of the secondary winding of the first transformer;

a diode and a low-resistance resistor which are connected in series with each other and in series with the secondary winding of said second transformer; and an output terminal connected to the connection between the diode and the low-resistance resistor.

16. The synchronous rectifier circuit as set forth in claim 14 wherein the switching block is connected between the second output of the synchronous rectifier circuit and the parallel circuit of the first MOSFET and the Schottky diode.

17. The synchronous rectifier circuit as set forth in claim 14 wherein the switching block is connected in series with the second end of the secondary winding of the first transformer.

18. The synchronous rectifier circuit as set forth in claim 14 wherein the switching block is connected in series with the primary winding of the first transformer.

\* \* \* \* \*